March 19, 1935.  W. DERMOTT  1,994,759

CUSHION

Filed March 6, 1933

Inventor
William Dermott
By Fred Gerlach
his Atty.

Patented Mar. 19, 1935

1,994,759

UNITED STATES PATENT OFFICE 1,994,759

CUSHION

William Dermott, Chicago, Ill., assignor to Van Cleef Bros., Chicago, Ill., a partnership composed of Noah Van Cleef, Felix Van Cleef, Maxime Van Cleef, and Paul Van Cleef Application March 6, 1933, Serial No. 659,723

13 Claims. (Cl. 219—46)

The present invention relates generally to cushions. More particularly, the invention relates to that type of cushion which is adapted to be distended or inflated with air and comprises marginally united, nonporous top and bottom members and a valve-equipped stem for use in inflating the cushion by mouth or an air hose.

One object of the invention is to provide a cushion of this type which has a greater range of use than previously designed pneumatic cushions in that it embodies an electric resistance element for heating purposes and hence may be used not only as a support or seat but as a medium for applying heat to sick people or the drivers or passengers of open air vehicles.

Another object of the invention is to provide a cushion of the last mentioned character which is extremely efficient by virtue of the fact that the electric resistance element is disposed between the non-porous top and bottom members, and the air with which the cushion is inflated serves to effect an even distribution of the heat from the element throughout substantially all parts of the cushion.

A further object of the invention is to provide a pneumatic cushion of the aforementioned type in which the electric resistance element is mounted on a supporting sheet of heavy fabric or like flexible material and is sustained by this sheet in substantially a central position with respect to the top and bottom, non-porous members when the cushion is inflated, in order to avoid burning of the members by direct contact with the element and to effect maximum efficiency as far as heating of the cushion is concerned.

A further object of the invention is to provide a pneumatic, electrically heated cushion of the type and character under consideration in which the top and bottom members are formed of rubber and are vulcanized together at different points throughout the interior portions of the cushion, and the electric resistance element for heating the cushion is mounted on the fabric supporting sheet so that it extends back and forth between the various points of contact, in order effectively and efficiently to heat the tortuous air space resulting from vulcanizing the members together at different points in the interior of the cushion.

A still further object of the invention is to provide a pneumatic cushion of the electrically heated variety which includes in the air space between the top and bottom members a device for automatically cutting out the electric resistance element when the temperature of the air in the space reaches a predetermined point.

In addition it is contemplated as one of the objects of the invention to provide a pneumatic cushion which is generally of new and improved construction and may be manufactured at a low and reasonable cost.

Other objects of the invention and the various advantages and characteristics of the present cushion construction will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 1:
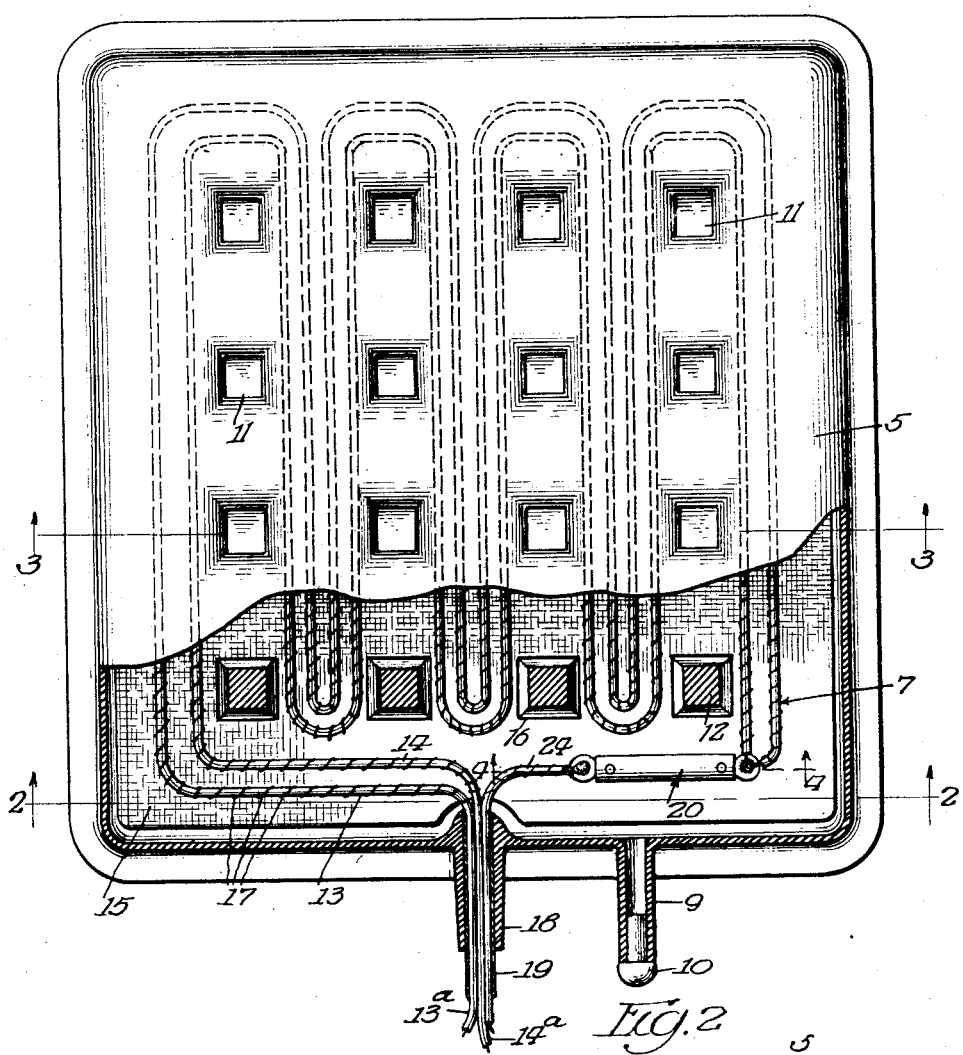
Figure 1 is a view, partly in plan and partly in section, of a cushion embodying the invention.
Figure 3:
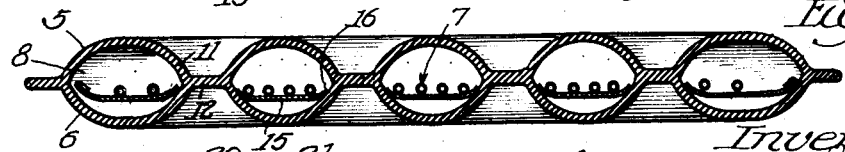
Figure 4:
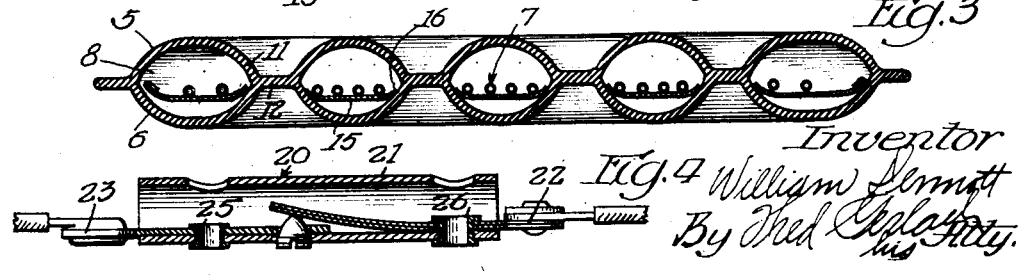

Figure 3 is a vertical transverse section taken on the line 3—3 of Figure 1 and showing the cross sectional construction of the fabric, resistance element supporting strip and the manner in which the rubber top and bottom members are vulcanized together at various points throughout the interior of the cushion; and Figure 4 is a detail sectional view of the device for automatically cutting out the resistance element when the temperature of the air in the cushion reaches a predetermined point.

The cushion which forms the subject matter of the invention is designed either as a support or seat, or as a medium for applying heat to sick people. It is of the pneumatic variety or type and comprises a rectangular top member 5, a rectangular bottom member 6 and an electric resistance element 7. The top member 5 is formed of non-porous, molded rubber and is of such thickness and character that it is highly flexible. The bottom member 6 underlies, and is of the same size as the top member 5, and is formed of the same material as the top member. It is highly flexible and has the margins thereof vulcanized to the margins of the top member 5 so that it is permanently connected to the top member and forms therewith a closed casing with an airtight chamber 8. This chamber is adapted to be filled with air by means of a stem 9. The latter, as shown in Figure 1 of the drawing, is formed integrally with the top and bottom members 5 and 6 at one of the margins of the cushion, and may be applied to the mouth of an air hose when it is desired to inflate or distend the cushion. A valve 10 is associated with the outer end of the stem 9 and serves, when closed, to prevent escape of air from the chamber 8 through the stem 9. This valve is preferably of the type that may be closed by turning a ferrule or sleeve and, when in its open position, allows the air in the chamber to escape. When it is desired to inflate or distend the cushion, the valve 10 is opened and air is introduced into the chamber 8 from the mouth or a pump. When the chamber 8 is filled with air to the desired extent, the valve 10 is closed by manipulation of the ferrule or sleeve. When it is desired to deflate the cushion, the valve 10 is opened and the cushion is rolled or flattened so as to expel the air from the chamber 8.

In order to prevent central bulging of the cushion when the latter is inflated or distended, the top member 5 is provided throughout substantially the entire or central interior portion thereof with depressed parts 11, and the bottom member 6 is provided with a corresponding number of upwardly extending, square parts 12. The parts 11 are preferably formed by a die in connection with the fabrication or molding of the top member and are arranged in rows extending longitudinally of the top member. The depressed parts 11 of each row are preferably aligned transversely with those of the other rows, as shown in Figure 1. The upwardly extending parts 12 of the bottom member 6 are formed during molding of the bottom member and underlie, and are arranged similarly to, the depressed parts 11. They are vulcanized directly to the parts 11 so that together with the latter they form points of attachment between the top and bottom members at spaced intervals throughout the interior or central portions of the members. When the cushion is inflated or distended, the parts 11 and 12 coact so as to limit outward movement of the top and bottom members. The parts 11 are in the form of inverted, frustrated, square pyramids in that they are downwardly tapered. The parts 12 are similar in conformation to the parts 11 and taper upwardly. By virtue of the fact that the parts 11 and 12 are vulcanized together, the air chamber 8 is more or less of a tortuous or serpentine design.

Figure 2:
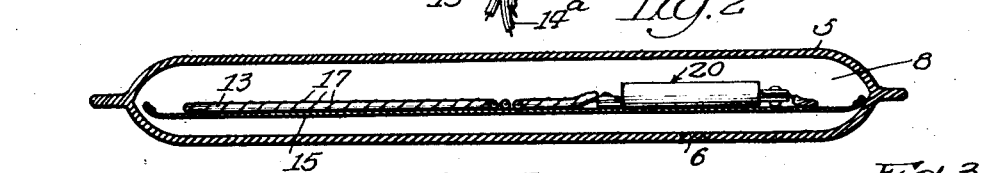
Figure 2 is a vertical transverse section taken on the line 2—2 of Figure 1 and showing in detail the manner in which the electric resistance element is substantially centrally supported with respect to the top and bottom members when the cushion is inflated.

The electric resistance element 7 consists of a pair of asbestos-covered, current-resisting wires 13 and 14 which are mounted on a flexible supporting sheet 15 in the air chamber 8 and are held by the sheet in a central position with respect to the top and bottom members 5 and 6 of the cushion when the cushion is distended or inflated by filling the chamber 8 with air. The sheet 15 is preferably formed of cores or heavy fabric and is rectangular in conformation. It is interposed between the top and bottom members 5 and 6 of the cushion and has square apertures 16 for accommodating the parts 11 and 12 which are associated with the top and bottom members 5 and 6 respectively and are vulcanized together as previously pointed out. The apertures 16 are preferably but slightly larger than are the parts 11 and 12 at the points where they are vulcanized together and as a result, when the cushion is distended or inflated, the supporting sheet 15 is spaced from the lowermost portions of the bottom member 6 as shown in Figures 2 and 3 of the drawing and serves to support the resistance element 7 substantially midway between the top and bottom members. The sheet 15, in addition to supporting the electric resistance element 7, serves to space the top and bottom members 5 and 6 apart so that they are not vulcanized together except at the margins thereof and between the parts 11 and 12. The asbestos-covered, current-resisting wires 13 and 14 which constitute the electric resistance element 7 are fastened to the top face of the supporting sheet 15 in any suitable manner, such, for example, as by stitching 17, and are arranged in side-by-side relation and so that they extend back and forth between the longitudinal rows of depressed parts 11. By arranging the wires 13 and 14 in this manner, substantially all portions of the interior of the cushion are heated when current is supplied to the resistance element.

Electrical current or energy is supplied to the resistance element by means of a pair of conductors 13ᵃ and 14ᵃ. These conductors are connected to the inlet ends of the wires 13 and 14 respectively, and lead into the air chamber 8 through a rubber stem 18. The latter, as shown in Figure 1, is molded as an integral part of the top and bottom members 5 and 6 and is positioned adjacent to the stem 9 which carries the valve 10. The conductors 13ᵃ and 14ᵃ are encased in a tubular rubber jacket 19 and are provided at the outer ends thereof with a plug (not shown) whereby they may be attached to a socket in an electrical circuit. The stem 18 is preferably vulcanized to the portion of the rubber jacket 19 which extends therethrough in order to seal the air chamber against leakage at the stem 18. The outlet ends of the current-resisting wires 13 and 14 of the electric resistance element are attached to one terminal of a device 20 for automatically breaking the circuit through the resistance element when the temperature of the air through the chamber 8 reaches a predetermined point. This device is located in the air space adjacent to the valve-equipped stem 9 and comprises a tube 21 of fiber or other non-conducting material, and a pair of terminals 22 and 23 which are associated with the ends of the tube respectively. The outlet ends of the wires 13 and 14 are connected to the terminal 22. A conductor 24 is attached to the terminal 23 and extends through the rubber jacket 19 together with the conductors 13ᵃ and 14ᵃ. The terminal 23 leads into the fiber tube 21, as shown in Figure 4, and is anchored in place by a rivet 25. The terminal 22 leads into the opposite end of the tube 21 and is in the form of a bimetallic strip which is adapted to contact at one end thereof with the inner end of the terminal 24 so as to complete the electrical circuit from the wires 13 and 14 to the conductor 24. When the temperature within the air space reaches a predetermined point, the inner end of the bimetallic strip which forms a part of the terminal 22 bends automatically out of contact with the terminal 23 and breaks the circuit. A rivet 26 extends through the fiber tube 21 and anchors in place the terminal 22. The circuit-breaking device 20 is mounted on the fabric supporting sheet 15 and is sustained thereby and midway between the top and bottom members of the cushion when the cushion is distended or inflated. If desired, a snap switch (not shown) may be included in the conductor 24 at a point outside of the rubber stem 18, in order to permit of ready control of the flow of current through the electric resistance element 7.

When it is desired to use the cushion, the valve 10 is opened by manipulation of the rotatable sleeve and air is introduced into the air chamber 8 by way of the stem 9. As soon as the cushion is inflated or distended to the desired extent, the valve 10 is closed. When it is desired to heat the cushion, the conductors 13ª and 14ª are connected to a suitable source of current supply by way of the plug at the end thereof. As the current passes through the wires 13 and 14 which constitute the resistance element 7, heat is produced and the air within the chamber 8 is heated and serves to transmit heat from the resistance element to the top and bottom members of the cushion. When the heat within the air space 8 reaches a predetermined point, the device 21 automatically breaks the circuit.

The herein described cushion may be manufactured at a comparatively low cost and has many advantages over a fabric heating pad or a hot water bottle, and may be efficiently and effectively used in connection with the application of heat to sick people or as a support or seat for the driver or passengers of a vehicle.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. As a new article of manufacture, an electrically heated, pneumatic cushion comprising flexible, non-porous members united marginally and forming a closed casing adapted to hold air under pressure, valve-controlled means for introducing air under pressure into the casing for cushion-inflating purposes, an electric resistance element in the casing, and means for conducting current to the element extending through the casing.

2. As a new article of manufacture, an electrically heated pneumatic cushion comprising flexible, non-porous, top and bottom members united marginally and forming a closed casing adapted to hold air under pressure, means for introducing air under pressure into the casing for cushion-inflating purposes, an electric resistance element in the casing, means for conducting current to the element extending through and seated in the casing, and means in said casing for supporting the element between and in spaced relation with respect to the top and bottom members when the cushion is inflated.

3. As a new article of manufacture, an electrically heated pneumatic cushion comprising flexible, non-porous, top and bottom members united marginally and forming a closed casing adapted to hold air under pressure, means for introducing air under pressure into the casing for cushion-inflating purposes, an electric resistance element in the casing, means for conducting current to the element extending through and sealed in the casing, and a flexible, element-supporting sheet arranged within the casing so as to support the element substantially midway between the top and bottom members when the cushion is inflated.

4. As a new article of manufacture, an electrically heated pneumatic cushion comprising flexible, non-porous, top and bottom members united marginally and forming a closed casing adapted to hold air under pressure, means for introducing air under pressure into the casing for cushion-inflating purposes, an electric resistance element in the casing, a stem leading from the casing to the outside of the cushion and connected to the top and bottom members along one of the united margins thereof, and a pair of conductors for supplying electric current to the resistance element extending through and sealed in the stem so as to prevent leakage therethrough.

5. As a new article of manufacture, an electrically heated pneumatic cushion comprising flexible, non-porous, top and bottom members united marginally and forming a closed casing adapted to hold air under pressure, means for introducing air under pressure into the casing for cushion-inflating purposes, an electric resistance element in the casing, a rubber stem leading from the casing to the outside of the cushion and connected to the top and bottom members along one of the united margins thereof, and a rubber covered pair of conductors for supplying electric current to the resistance element extending through and vulcanized to the stem so as to prevent leakage therethrough.

6. As a new article of manufacture, an electrically heated pneumatic cushion comprising non-porous, top and bottom members vulcanized together at the margins thereof and forming a closed casing adapted to hold air under pressure, a pair of stems connected to and extending laterally from the members along one of the united margins thereof, a valve associated with one of the stems whereby said stem may be used for introducing air into and discharging air from the casing, an electric resistance element in the casing, and a pair of conductors for supplying electrical energy to the resistance element extending through and sealed in the other stem so as to prevent leakage therethrough.

7. As a new article of manufacture, an electrically heated pneumatic cushion comprising non-porous, sheet rubber, top and bottom members vulcanized together at the margins thereof and forming a closed casing adapted to hold air under pressure, a pair of laterally extending, rubber stems arranged in side-by-side relation and formed integrally with the members at points along one of the united margins thereof, a valve in one of the stems whereby said stem may be used to introduce air under pressure into and exhaust air from the casing, an electric resistance element disposed in the casing, and a pair of rubber-covered conductors for supplying electrical energy to the resistance element extending through and vulcanized to the other stem so as to prevent leakage therethrough.

8. As a new article of manufacture, an electrically heated pneumatic cushion comprising flexible, non-porous, marginally united, top and bottom members forming a closed casing for air under pressure and joined together at different points throughout the interior portions thereof so as to limit inflation of the cushion, valve-controlled means for introducing air under pressure into the casing for cushion-inflating purposes, an electric resistance element disposed in the casing and arranged so that it extends back and forth between the points of juncture of the top and bottom member, and means for supplying current to the resistance element extending through and sealed in the casing.

9. As a new article of manufacture, an electrically heated pneumatic cushion comprising flexible, non-porous, marginally united, top and bottom members forming a closed casing for air under pressure and joined together at different points throughout the interior portions thereof so as to limit inflation of the cushion, valve-controlled means for introducing air under pressure into the casing for cushion-inflating purposes, an electric resistance element disposed in the casing, means for supplying current to the element extending through and sealed in the casing, and a flexible sheet for supporting the element substantially midway between the top and bottom members when the cushion is inflated, disposed in the casing between said top and bottom members and having apertures for accommodating the joined or united interior portions of the top and bottom members.

10. As a new article of manufacture, an electrically heated pneumatic cushion comprising flexible, non-porous members united marginally and forming a closed casing adapted to hold air under pressure, means for introducing air under pressure into the casing for cushion-inflating purposes, an electric resistance element in the casing, means for conducting current to the element extending through and seated in the casing, and means in said casing for automatically interrupting the flow of current through the element when the temperature of the air in the casing reaches a predetermined degree.

11. As a new article of manufacture, an electrically heated pneumatic cushion comprising non-porous, sheet rubber, marginally united, top and bottom members forming a closed casing for air under pressure and vulcanized together at different points throughout the interior portions thereof so as to limit inflation of the cushion, valve-controlled means for introducing air under pressure into the casing for cushion-inflating purposes, a flexible sheet disposed in the casing between the top and bottom members and having apertures therein for accommodating the vulcanized interior parts of the top and bottom members, an electric resistance element mounted on the sheet and arranged so that it extends back and forth between said vulcanized parts, and a pair of conductors for supplying electrical energy to the element extending through and sealed in the casing.

12. As a new article of manufacture, an electrically heated pneumatic cushion comprising non-porous, sheet rubber, marginally united, top and bottom members forming a closed casing for air under pressure and vulcanized together at different points throughout the interior portions thereof so as to limit inflation of the cushion, valve-controlled means for introducing air under pressure into the casing for cushion-inflating purposes, a flexible sheet disposed in the casing between the top and bottom members and having apertures therein for accommodating the vulcanized interior parts of the top and bottom members, an electric resistance element mounted on and supported by the flexible sheet and arranged so that it extends back and forth between said vulcanized interior parts, and a pair of conductors for supplying electrical current to the resistance element leading through and sealed in the casing and including in said casing a device for automatically breaking the circuit through the resistance element when the temperature of the air in the casing reaches a predetermined degree.

13. An electrically heated pneumatic cushion comprising a closed casing containing an electric resistance element and adapted to retain air under pressure, valve-controlled means for introducing air under pressure into the casing for cushion inflating purposes, and means for supplying current to the element extending through and sealed in the casing.

WILLIAM DERMOTT.